(12) United States Patent
Kato

(10) Patent No.: US 12,187,284 B2
(45) Date of Patent: Jan. 7, 2025

(54) VEHICLE CONTROL DEVICE AND VEHICLE CONTROL METHOD FOR CHANGING TRAVEL CONTROL ACCORDING TO A RECOGNITION STATUS OF DRIVING LANE

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/281,579

(22) PCT Filed: Sep. 2, 2021

(86) PCT No.: PCT/JP2021/032292
§ 371 (c)(1),
(2) Date: Sep. 12, 2023

(87) PCT Pub. No.: WO2023/032123
PCT Pub. Date: Mar. 9, 2023

(65) Prior Publication Data
US 2024/0166210 A1 May 23, 2024

(51) Int. Cl.
*B60W 60/00* (2020.01)
*B60W 10/04* (2006.01)
(Continued)

(52) U.S. Cl.
CPC ...... *B60W 30/18163* (2013.01); *B60W 10/20* (2013.01); *B60W 10/04* (2013.01);
(Continued)

(58) Field of Classification Search
CPC ........... B60W 30/18163; B60W 10/20; B60W 10/04; B60W 10/18; B60W 60/0053;
(Continued)

(56) References Cited

U.S. PATENT DOCUMENTS

2017/0197635 A1* 7/2017 Sato ................. B60W 60/0059
2019/0061808 A1* 2/2019 Mizoguchi ............. G01C 21/26
(Continued)

FOREIGN PATENT DOCUMENTS

JP 2015-175825 10/2015
JP 2019-207190 12/2019
(Continued)

OTHER PUBLICATIONS

International Search Report and Written Opinion for International Application No. PCT/JP2021/032292 mailed on Nov. 22, 2021, 10 pages.

*Primary Examiner* — Daniel M. Robert
(74) *Attorney, Agent, or Firm* — Amin, Turocy & Watson, LLP

(57) ABSTRACT

A vehicle control device of the embodiment includes a recognizer configured to recognize a surrounding situation of a vehicle and a driving controller configured to control one or both of steering and a speed of the vehicle on the basis of the surrounding situation recognized by the recognizer, in which the driving controller causes the vehicle to travel by executing any one of a plurality of driving modes including at least a first driving mode and a second driving mode in which a task imposed on an occupant of the vehicle is heavier than in the first driving mode, and switches from the first driving mode to the second driving mode when a first section in which the number of lanes of a road on which the vehicle travels is different from the current number of lanes and a second section in which a road having at least three lanes branches are present within a predetermined distance in a traveling direction of the vehicle while the first driving mode is executed.

12 Claims, 9 Drawing Sheets

(51) Int. Cl.
*B60W 10/18* (2012.01)
*B60W 10/20* (2006.01)
*B60W 30/18* (2012.01)

(52) U.S. Cl.
CPC ......... *B60W 10/18* (2013.01); *B60W 60/0053* (2020.02); *B60W 2552/10* (2020.02); *B60W 2556/40* (2020.02); *B60W 2710/20* (2013.01); *B60W 2720/10* (2013.01)

(58) Field of Classification Search
CPC ......... B60W 2552/10; B60W 2556/40; B60W 2710/20; B60W 2720/10
See application file for complete search history.

(56) References Cited

U.S. PATENT DOCUMENTS

| | | | |
|---|---|---|---|
| 2019/0344795 A1* | 11/2019 | Ishioka | G08G 1/09 |
| 2019/0354107 A1* | 11/2019 | Kato | G08G 1/096758 |
| 2020/0041299 A1 | 2/2020 | Kato et al. | |
| 2020/0307593 A1* | 10/2020 | Hirosawa | B60W 10/20 |
| 2022/0219692 A1* | 7/2022 | Taniguchi | G06V 20/56 |
| 2022/0266869 A1 | 8/2022 | Ito et al. | |

FOREIGN PATENT DOCUMENTS

| | | | |
|---|---|---|---|
| JP | 2020-163900 | 10/2020 | |
| WO | 2016/080452 | 5/2016 | |
| WO | WO-2016080452 A1 * | 5/2016 | ......... B60W 30/00 |
| WO | 2018/142576 | 8/2018 | |
| WO | 2020/022386 | 1/2020 | |
| WO | 2020/230308 | 11/2020 | |

* cited by examiner

FIG. 2

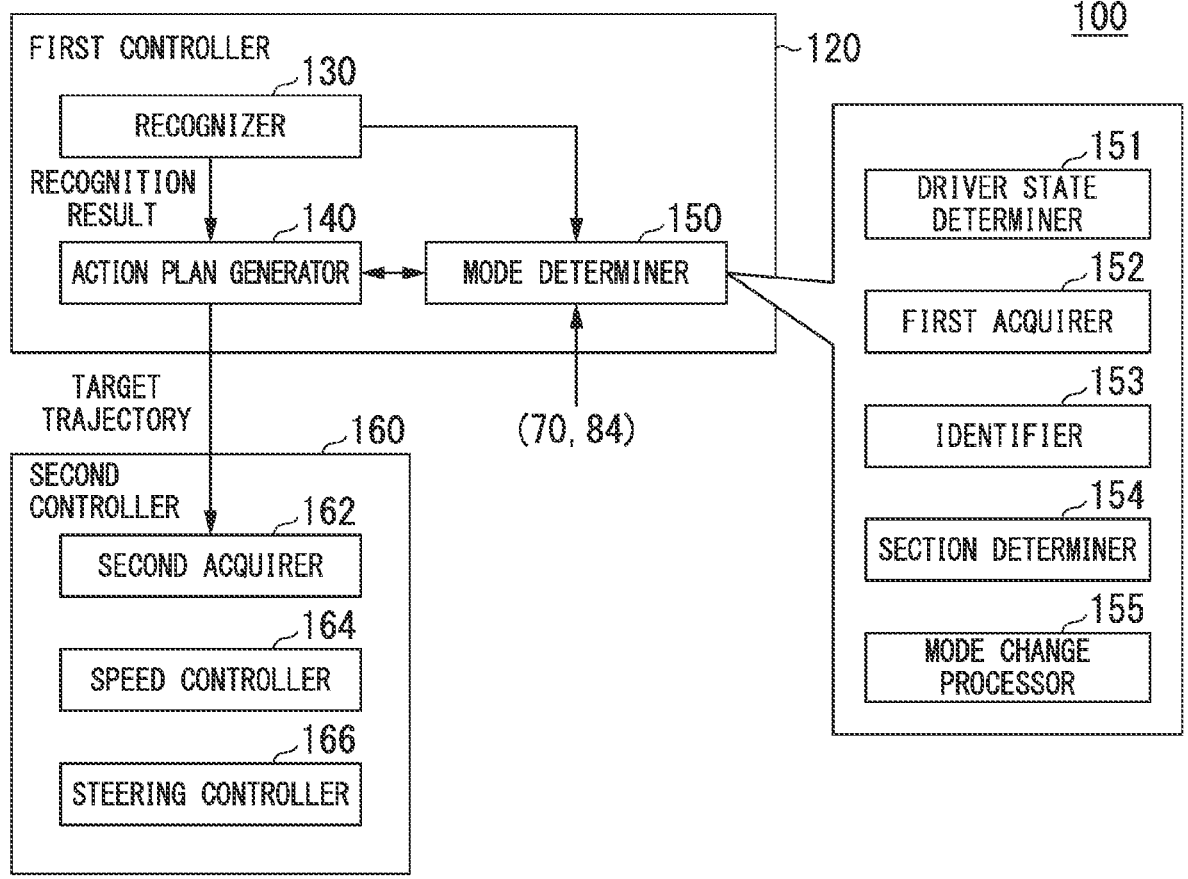

FIG. 3

| DRIVING MODE | | CONTROL STATE | TASK | |
|---|---|---|---|---|
| FIRST DRIVING MODE | MODE A | AUTOMATED DRIVING | SURROUNDING MONITORING:NOT REQUIRED STEERING GRIP:NOT REQUIRED | TASK:LIGHTEST ↑ |
| | MODE B | DRIVING ASSISTANCE | SURROUNDING MONITORING:REQUIRED STEERING GRIP:NOT REQUIRED | |
| SECOND DRIVING MODE | MODE C | DRIVING ASSISTANCE | SURROUNDING MONITORING:REQUIRED STEERING GRIP:REQUIRED | |
| | MODE D | DRIVING ASSISTANCE | SURROUNDING MONITORING:REQUIRED AT LEAST CERTAIN LEVEL OF DRIVING OPERATION IS REQUIRED | |
| | MODE E | MANUAL DRIVING | SURROUNDING MONITORING:REQUIRED STEERING, ACCELERATION OR DECELERATION, AND DRIVING OPERATION ARE REQUIRED | ↓ TASK:HEAVIEST |

FIG. 10

| THE NUMBER OF LANES OF ROAD ON WHICH VEHICLE IS TRAVELING | INCREASE OR DECREASE IN THE NUMBER OF LANES | TYPE OF SPECIFIC BRANCH | LANE UNIDENTIFIABLE PATTERN |
|---|---|---|---|
| 2 | THREE LANES (INCREASE) | THREE LANES (1:2) | CENTRAL LANE IS UNIDENTIFIABLE |
| 3 | FOUR LANES (INCREASE) | FOUR LANES (2:2) | TWO LANES ARE UNIDENTIFIABLE |
| 5 | FOUR LANES (DECREASE) | | THREE LANES ARE UNIDENTIFIABLE |
| 4 | FIVE LANES (INCREASE) | FIVE LANES (2:3) | TWO LANES ARE UNIDENTIFIABLE |
| 6 | FIVE LANES (DECREASE) | | THREE LANES ARE UNIDENTIFIABLE |
| 5 | SIX LANES (INCREASE) | SIX LANES (3:3) | THREE LANES ARE UNIDENTIFIABLE |
| 7 | SIX LANES (DECREASE) | | FOUR LANES ARE UNIDENTIFIABLE |
| ... | ... | ... | ... |

VEHICLE CONTROL DEVICE AND VEHICLE CONTROL METHOD FOR CHANGING TRAVEL CONTROL ACCORDING TO A RECOGNITION STATUS OF DRIVING LANE

TECHNICAL FIELD

The present invention relates to a vehicle control device and a vehicle control method.

BACKGROUND ART

In recent years, research on automated driving, which automatically controls the traveling of a vehicle, has been in progress. With regard to this, a technology that identifies a discontinuation recommended section in which there is a discontinuation reason for discontinuing automated driving control in an automated driving section included in a scheduled traveling route, and identifies a discontinuation section of automated driving control on the basis of traffic information around the discontinuation recommended section is known (for example, refer to Patent Document 1). In addition, a technology that estimates a self-position of a vehicle on a map on the basis of a surrounding image of the vehicle, a state quantity, latitude and longitude, and map data, and if a section having an increase or decrease in the number of lanes on a road is recognized, corrects the estimated position based on the map data by making a weighting of the estimated position based on the map data smaller than when a section having an increase or decrease in the number of lanes is not recognized is known (for example, refer to Patent Document 2).

CITATION LIST

Patent Document

[Patent Document 1]
   Japanese Unexamined Patent Application, First Publication No. 2015-175825
[Patent Document 2]
   Japanese Unexamined Patent Application, First Publication No. 2019-4207190

SUMMARY OF INVENTION

Technical Problem

However, in the prior art, when the discontinuation recommended section is not defined or when the position of a vehicle is not correctly estimated, driving control such as automated driving is forcibly caused to end or control of lowering a mode of the driving control is performed, and thus it may not be possible in some cases to continue the driving control even in a situation where there are no problems in actually continuing the driving control.

The aspects of the present invention have been made in view of such circumstances, and an object thereof is to provide a vehicle control device, a vehicle control method, and a program capable of changing a control degree of driving control in a more appropriate situation.

Solution to Problem

The vehicle control device, the vehicle control method, and the program according to the present invention have adopted the following configuration.

(1): A vehicle control device according to one aspect of the present invention includes a recognizer configured to recognize a surrounding situation of a vehicle, and a driving controller configured to control one or both of steering and a speed of the vehicle on the basis of the surrounding situation recognized by the recognizer, in which the driving controller causes the vehicle to travel by executing any one of a plurality of driving modes including at least a first driving mode and a second driving mode in which a task imposed on an occupant of the vehicle is heavier than in the first driving mode, and switches from the first driving mode to the second driving mode when a first section in which the number of lanes of a road on which the vehicle travels is different from the current number of lanes and a second section in which a road having at least three lanes branches are present within a predetermined distance in a traveling direction of the vehicle while the first driving mode is executed.

(2): A vehicle control device according to another aspect of the present invention includes a recognizer configured to recognize a surrounding situation of a vehicle, a driving controller configured to control one or both of steering and a speed of the vehicle on the basis of the surrounding situation recognized by the recognizer, an acquirer configured to acquire first map information including lane information around a vehicle and reference information for identifying a position of the vehicle, and an identifier configured to identify a traveling lane of the vehicle among one or more lanes included in a road on which the vehicle travels from the first map information on the basis of the reference information acquired by the acquirer, in which the driving controller causes the vehicle to travel by executing any one of a plurality of driving modes including at least a first driving mode and a second driving mode in which a task imposed on an occupant of the vehicle is heavier than in the first driving mode, executes the first driving mode when a traveling lane of the vehicle is identified by the identifier, causes the execution of the first driving mode to be continued when a first section in which the traveling lane of the vehicle is undefinable by the identifier or a second section in which a road having at least three lanes branches is present within a predetermined distance in a traveling direction of the vehicle, and switches from the first driving mode to the second driving mode when the first section and the second section are present within the predetermined distance.

(3): In the aspect of (2) described above, the first section may be a road section in which the number of lanes is different from the number of lanes of a road on which the vehicle is currently traveling.

(4): In the aspect of (2) or (3) described above, the driving controller may switch from the first driving mode to the second driving mode before the vehicle enters the second section when the second section is present within a predetermined distance from the vehicle in a state in which the traveling lane of the vehicle when traveling in the first section is not identified by the identifier while the first driving mode is executed.

(5): In the aspect of (2) or (3) described above, the driving controller may not switch from the first driving mode to the second driving mode when, even if the second section is present within a predetermined distance from the vehicle, a branch destination road of the second section on which the vehicle travels is identifiable in a state in which the traveling lane of the vehicle when traveling in the first section is not identified by the identifier while the first driving mode is executed.

(6): In the aspect of (1) or (2) described above, the driving controller may switch from the first driving mode to the second driving mode when the first section and the second section are present within a predetermined distance in the traveling direction of the vehicle while the first driving mode is executed, and the vehicle travels in a lane other than a rightmost or leftmost lane of the road.

(7): In the aspect of (2) described above, the first map information may be lane information for each road.

(8): In the aspect of (2) described above, the identifier may identify the traveling lane of the vehicle on the basis of type information of road lane markings around the vehicle recognized by the recognizer or information on a target for which a lane position is identifiable.

(9): In the aspect of (2) described above, the identifier may identify the traveling lane of the vehicle on the basis of a direction in which a lane change of the vehicle is performed and the number of the lane changes.

(10): In the aspect of (2) described above, the identifier may cause the driving controller to change lanes to a lane in which the traveling lane of the vehicle is identifiable when the traveling lane of the vehicle is not identifiable.

(11): In the aspect of (2) described above, the vehicle control device may further include an imager configured to capture an image of the surroundings of the vehicle, in which the identifier may recognize a type of lane markings of adjacent lanes adjacent to the traveling lane of the vehicle on the basis of an image captured by the imager and identify the traveling lane of the vehicle on the basis of the recognized type of lane markings when the traveling lane of the vehicle is not identifiable.

(12): In the aspect of (2) described above, the acquirer may acquire the first map information and second map information storing at least road information for each lane, and the driving controller may continue the first driving mode on the basis of the first map information when the second map information is not acquirable.

(13): In the aspect of any one of (1) to (12) described above, the vehicle control device may further include an output controller configured to cause an output device to output information prompting an occupant of the vehicle to execute a task according to the second driving mode when a driving mode of the vehicle is switched from the first driving mode to the second driving mode by the driving controller.

(14): A vehicle control method according to another aspect of the present invention includes, by a computer, recognizing a surrounding situation of a vehicle, controlling one or both of steering and a speed of the vehicle on the basis of the recognized surrounding situation, causing the vehicle to travel by executing any one of a plurality of driving modes including at least a first driving mode and a second driving mode in which a task imposed on an occupant of the vehicle is heavier than in the first driving mode, and switching from the first driving mode to the second driving mode when a first section in which the number of lanes of a road on which the vehicle travels is different from the current number of lanes, and a second section in which a road having at least three lanes branches are present within a predetermined distance in a traveling direction of the vehicle while the first driving mode is executed.

(15): A program according to still another aspect of the present invention causes a computer to execute recognizing a surrounding situation of a vehicle, controlling one or both of steering and a speed of the vehicle on the basis of the recognized surrounding situation, causing the vehicle to travel by executing any one of a plurality of driving modes including at least a first driving mode and a second driving mode in which a task imposed on an occupant of the vehicle is heavier than in the first driving mode, and switching from the first driving mode to the second driving mode when a first section in which the number of lanes of a road on which the vehicle travels is different from the current number of lanes, and a second section in which a road having at least three lanes branches are present within a predetermined distance in a traveling direction of the vehicle while the first driving mode is executed.

Advantageous Effects of Invention

According to the aspects of (1) to (15) described above, it is possible to change a control degree of driving control in a more appropriate situation.

BRIEF DESCRIPTION OF DRAWINGS

FIG. 2 is a functional configuration diagram of a first controller 120 and a second controller 160.

FIG. 3 is a diagram which shows an example of relationship between a driving mode, a control state of a vehicle M, and a task.

FIG. 10 is a diagram for describing lane identification conditions when the number of lanes increases or decreases and when there is a branch.

DESCRIPTION OF EMBODIMENTS

Hereinafter, embodiments of a vehicle control device, a vehicle control method, and a program of the present invention will be described with reference to the drawings.

[Overall Configuration]

Figure 1:
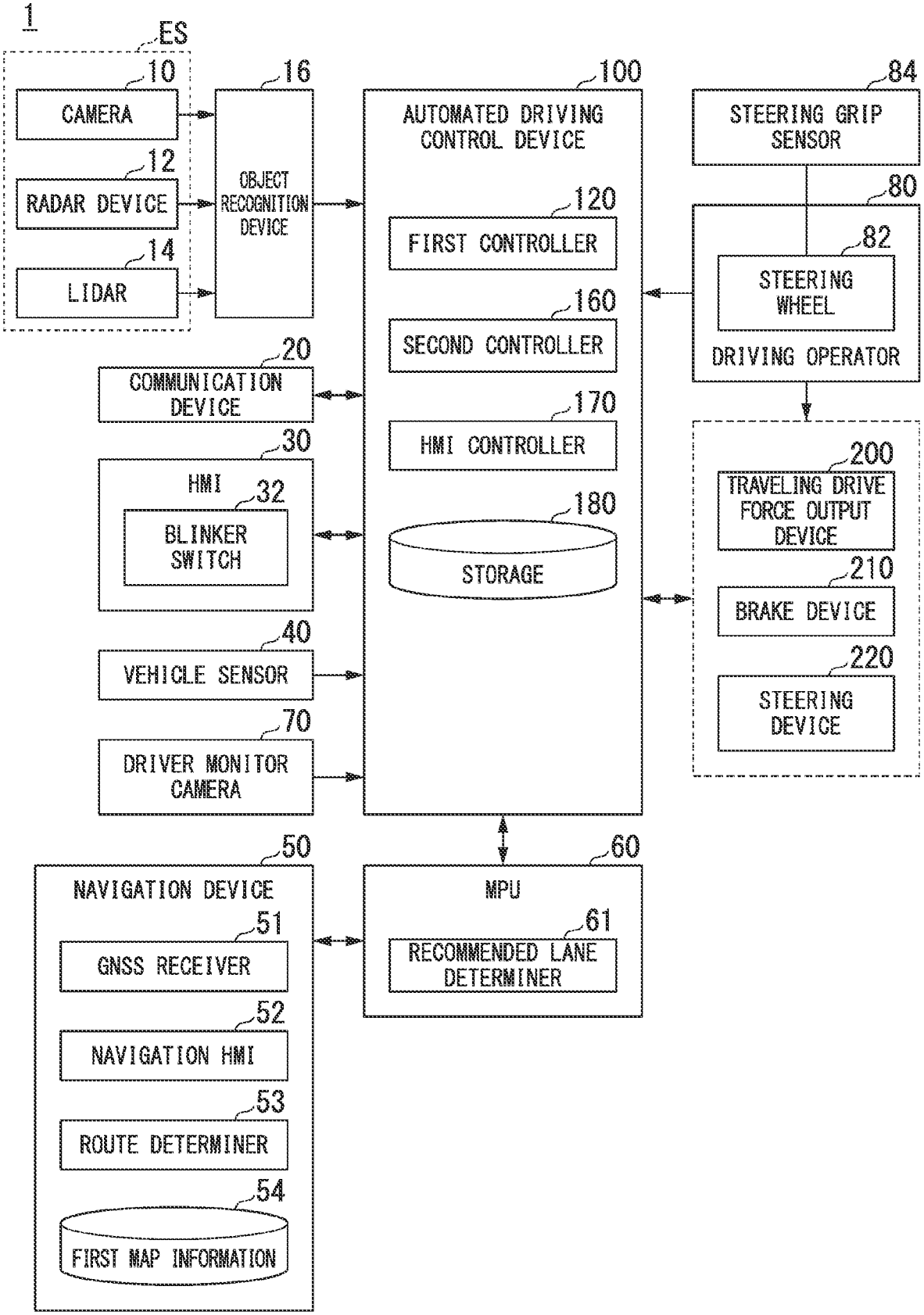
FIG. 1 is a configuration diagram of a vehicle system 1 using a vehicle control device according to an embodiment.

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells. In addition, as an example in the following description, an embodiment in which the vehicle control device is applied to an automated driving vehicle will be described. Automated driving means, for example, automatically controlling one or both of steering and acceleration or deceleration of a vehicle to execute driving control. Driving control of a vehicle may include, for example, various types of driving assistance such as adaptive cruise control (ACC), auto lane changing (ALC), and a lane keeping assistance system (LKAS). An automated driving vehicle may have its driving partially or entirely controlled by manual driving of the occupant (the driver).

The vehicle system 1 includes, for example, a camera (an example of an imager) 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitor camera 70, a driving operator 80, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. A combination of the camera 10, the radar device 12, and the LIDAR 14 is an example of an "external sensor ES." The external sensor ES may include other detectors that recognize a surrounding situation of a vehicle, and may also include the object recognition device 16. The HMI 30 is an example of an "output device." The automated driving control device 100 are an example of the "vehicle control device."

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a vehicle M). For example, when an image of the front of the vehicle M is captured, the camera 10 is attached to an upper part of the front windshield, a back surface of the windshield rear-view mirror, and the like. In addition, when an image of a rear of the vehicle M is captured, the camera 10 is attached to an upper part of the rear windshield, the back door, or the like. Moreover, when images of a side and a rear side of the vehicle M are captured, the camera 10 is attached to a door mirror or the like. The camera 10 repeatedly captures, for example, images of the surroundings of the vehicle M periodically. The camera 10 may be a stereo camera. In addition, as the camera 10, a plurality of cameras (for example a first camera, a second camera) may be provided, the plurality of cameras may be used to capture images in the same direction, the first camera may be normally used to capture images, and the second camera or both the first camera and the second camera may also be used to capture images when a predetermined condition is satisfied. In addition, it is also possible to use the first camera to capture an image of a vicinity of the vehicle M and the second camera to capture an image of a distant place of the vehicle M.

The radar device 12 radiates radio waves such as millimeter waves to the surroundings of the vehicle M, and also detects at least a position (a distance and an orientation) of an object by detecting radio waves (reflected waves) reflected by the object. The radar device 12 is attached to an arbitrary place on the vehicle M. The radar device 12 may detect the position and speed of an object in a frequency modulated continuous wave (FM-CW) method.

The LIDAR 14 irradiates the surroundings of the vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the vehicle M.

The object recognition device 16 performs sensor fusion processing on a result of detection by a part or all of the camera 10, the radar device 12, and the LIDAR 14 that are included in the external sensor ES, and recognizes the position, type, speed, and the like of an object. The object recognition device 16 outputs a result of recognition to the automated driving control device 100. The object recognition device 16 may output the results of detection by the camera 10, the radar device 12, and the LIDAR 14 to the automated driving control device 100 as they are. The object recognition device 16 may be omitted from the vehicle system 1.

The communication device 20 communicates with other vehicles present in the surroundings of the vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to an occupant of the vehicle M and receives an input operation by the occupant under control of the HMI controller 170. The HMI 30 includes, for example, various display devices, a speaker, a switch, a microphone, a buzzer, a touch panel, a key, and the like. Various display devices are, for example, a liquid crystal display (LCD) display device, an organic electro luminescence (EL) display device, and the like. The display device is provided, for example, near a front of the driver's seat (a seat closest to the steering wheel) on the instrument panel, and is installed at a position where the occupant can visually recognize it from a gap of the steering wheel or over the steering wheel. In addition, the display device may be installed in a center of the instrument panel. In addition, the display device may also be a head up display (HUD). The HUD makes a virtual image visible to eyes of the occupant sitting in the driver's seat by projecting an image onto a part of a front windshield in front of the driver's seat. The display device displays an image generated by the HMI controller 170 that will be described below. Moreover, the HMI may include a driving changeover switch or the like for switching between automated driving and manual driving by the occupation. The switch includes, for example, a blinker switch (direction indicator) 32. The blinker switch 32 is provided, for example, on a steering column or a steering wheel. The blinker switch 32 is, for example, an example of an operator that receives an instruction for a lane change of the vehicle M from the occupant.

The vehicle sensor 40 includes a vehicle speed sensor that detects a speed of the vehicle M, an acceleration sensor that detects acceleration, a yaw rate sensor that detects an angular speed around a vertical axis, an azimuth sensor that detects a direction of the vehicle M, and the like. In addition, the vehicle sensor 40 may also include a steering angle sensor that detects a steering angle of the vehicle M (which may be an angle of the steering wheel or an operating angle of the steering wheels). The vehicle sensor 40 may also include a position sensor that acquires a position of the vehicle M. A position sensor is, for example, a sensor that acquires positional information (longitude/latitude information) from a global positioning system (GPS) device. Moreover, the position sensor may be a sensor that acquires the positional information using a global navigation satellite system (GNSS) receiver 51 of the navigation device 50.

The navigation device 50 includes, for example, a GNSS receiver 51, a navigation HMI 52, and a route determiner 53. The navigation device 50 holds first map information 54 in a storage device such as a hard disk drive (HDD) or a flash memory. The GNSS receiver 51 identifies the position of the vehicle M based on a signal received from a GNSS satellite. The position of the vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the vehicle M (or an arbitrary position to be input) identified by the GNSS receiver 51 to a destination to be input by the occupant using the navigation HMI 52 (hereinafter, a route on a map) with reference to the first map information 54. The first map information 54 includes, for example, information to which information on lanes is added for each road (hereinafter referred to as lane information). Lane information includes, for example, a node indicating a start and an end of a road section, and a link representing a road shape between nodes. In addition, lane information includes the number of lanes (lane number) for each road. The first map information 54 may include a distance and a curvature of a road section, a road type (for example, expressways and general roads), point of interest (POI) information, and the like. A route on a map is output to the MPU 60. The navigation device 50 may provide route guidance using the navigation HMI 52 on the basis of the route on a map. The navigation device 50 may be realized by, for example, a function of a terminal device such as a smartphone or a tablet terminal carried by the occupant. The navigation device 50 may transmit a current position and a destination to a navigation server via the communication device 20 and acquire a route equivalent to the route on a map from the navigation server. Note that the first map information 54 may also be stored in a storage 180 instead of the navigation device 50.

The MPU 60 includes, for example, a recommended lane determiner 61. The recommended lane determiner 61 divides the route on a map provided from the navigation device 50 into a plurality of blocks (for example, divides every 100 [m] in a vehicle traveling direction), and determines a recommended lane based on lane information of the first map information 54 for each block. In addition, the recommended lane determiner 61 may also determine a recommended lane in units of road stored in the first map information 54. For example, the recommended lane determiner 61 determines which numberth lane from the left to drive. When there is a branch place on the route on a map, the recommended lane determiner 61 determines a recommended lane so that the vehicle M can travel on a reasonable route to proceed to the branch destination.

The driver monitor camera 70 is, for example, a digital camera using a solid-state imaging device such as CCD or CMOS. For example, the driver monitor camera 70 is attached at any place on the vehicle M, which is a position and a direction at which the head of an occupant (hereafter referred to as a driver) seated in a driver's seat of the vehicle M can be imaged from the front (in a direction for capturing an image of the face). For example, the driver monitor camera 70 is attached to an upper portion of a display device provided in a center portion of an instrument panel of the vehicle M.

The driving operator 80 includes, for example, in addition to the steering wheel 82, an accelerator pedal, a brake pedal, a shift lever, and other operators. The driving operator 80 has a sensor that detects the amount of operation or a presence or absence of an operation attached thereto, and a result of detection is output to the automated driving control device 100, or some or all of the traveling drive force output device 200, the brake device 210, and the steering device 220. The steering wheel 82 is an example of an "operator that receives a steering operation from a driver." The operator does not necessarily have to be circular, and may be in a form of a deformed steering wheel, a joystick, a button, or the like. A steering grip sensor 84 is attached to the steering wheel 82. The steering grip sensor 84 is realized by an electrostatic capacitance sensor or the like, and outputs a signal capable of detecting whether the driver is gripping the steering wheel 82 (being in a contact in a state where force is applied) to the automated driving control device 100.

The automated driving control device 100 includes, for example, a first controller 120, a second controller 160, an HMI controller 170, and a storage 180. The first controller 120, the second controller 160, and the HMI controller 170 are realized by, for example, a hardware processor such as a central processing unit (CPU) executing a program (software), respectively. In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device. A combination of the action plan generator 140 and the second controller 160 is an example of a "driving controller." The HMI controller 170 is an example of an "output controller."

The storage 180 may be realized by various storage devices described above, a solid state drive (SSD), an electrically erasable programmable read only memory (EEPROM), a read only memory (ROM), a random access memory (RAM), or the like. The storage 180 stores, for example, information necessary for executing driving control in the present embodiment, programs, other various information, and the like. In addition, the first map information 54 may be stored in the storage 180.

FIG. 2 is a functional configuration diagram of the first controller 120 and the second controller 160 according to the embodiment. The first controller 120 includes, for example, the recognizer 130, the action plan generator 140, and a mode determiner 150. The first controller 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating the both. As a result, reliability of automated driving is ensured.

The recognizer 130 recognizes the position of an object in the surroundings of the vehicle M and states such as a speed and acceleration thereof on the basis of information input from the external sensor ES. The position of an object is recognized as, for example, a position on absolute coordinates with a representative point (a center of gravity, a center of a drive axis, or the like) of the vehicle M as an origin, and is used for control. The position of an object may be represented by a representative point such as the center of gravity or a corner of the object, or may be represented by an area. The "states" of an object may include the acceleration or jerk of the object, or a "behavioral state" (for example, whether a lane is being changed or is about to be changed).

In addition, the recognizer 130 recognizes, for example, a lane (a traveling lane) in which the vehicle M is traveling. For example, the recognizer 130 recognizes left and right road lane markings of the vehicle M based on an image captured by the camera 10, and recognizes a traveling lane marked by the recognized road lane markings. The recognizer 130 may also recognize a traveling lane by recognizing not only the road lane marking but also road boundaries including the road lane marking, a road shoulder, a curb, a median strip, a guardrail, and the like. In this recognition, the position of the vehicle M acquired from the navigation device 50 and a result of processing by the INS may be taken into account. In addition, the recognizer 130 may also recognize stop lines, obstacles, red lights, tollhouses, and other road events.

The recognizer 130 recognizes the position and posture of the vehicle M with respect to a traveling lane when a traveling lane is recognized. The recognizer 130 may recognize, for example, a deviation of a reference point of the vehicle M from a center of the lane and an angle of the vehicle M, formed with respect to a line connecting the centers of the lane in the traveling direction, as a relative position and the posture of the vehicle M with respect to the traveling lane. Instead, the recognizer 130 may recognize the position or the like of the reference point of the vehicle M with respect to any side end (a road lane marking or road boundary) of the traveling lane as the relative position of the vehicle M with respect to the traveling lane.

In principle, the action plan generator 140 travels in a recommended lane determined by the recommended lane determiner 61, and, furthermore, generates a target trajectory on which the vehicle M will automatically travel (regardless of an operation of a driver) in the future so as to be able to respond to the surrounding situation of the vehicle M. The target trajectory includes, for example, a speed element. For example, the target trajectory is expressed as a sequence of points (trajectory points) to be reached by the vehicle M. The trajectory point is a point to be reached by the vehicle M for each predetermined traveling distance (for example, about several [m]) along a road, and, separately, a target speed and a target acceleration for each predetermined sampling time (for example, about decimal point number [sec]) are generated as a part of the target trajectory. In addition, the trajectory point may be a position to be reached by the vehicle M at a corresponding sampling time for each predetermined sampling time. In this case, information on the target speed and target acceleration is expressed by an interval between trajectory points.

The action plan generator 140 may set an event (function) of automated driving when a target trajectory is generated. The event of automated driving includes a constant-speed traveling event, a low-speed following traveling event, a lane change event, a branching event, a merging event, and a takeover event. The action plan generator 140 generates a target trajectory according to an event to be started.

The mode determiner 150 determines a driving mode of the vehicle M between a plurality of driving modes with different tasks imposed on the driver (in other words, a plurality of modes with different degrees of automation). The mode determiner 150 includes, for example, a driver state determiner 151, a first acquirer 152, an identifier 153, a section determiner 154, and a mode change processor 155. These individual functions will be described below.

FIG. 3 is a diagram which shows an example of relationships among a driving mode, a control state of the vehicle M, and a task. In the example of FIG. 3, the driving mode of the vehicle M includes, for example, five modes, from a mode A to a mode E. In FIG. 3, it is assumed that the modes A and B are examples of a "first driving mode," and the modes C, D, and E are examples of a "second driving mode." The driving mode may include modes other than the modes A to E, and may also include driving modes other than the first driving mode and the second driving mode. In the mode A to the mode E, the control state, that is, a degree of automation of the driving control of the vehicle M (a degree of control) is the highest in the mode A, decreases in order of the mode B, the mode C, and the mode D, and is the lowest in the mode E. On the other hand, the task imposed on the driver (occupant) is the lightest in the mode A, then increases in the order of the mode B, the mode C, and the mode D, and is the heaviest in the mode E in which manual driving is performed. Since the control state is not automated driving in the modes B to E, a responsibility of the automated driving control device 100 is to end control related to automated driving and to shift to driving assistance or manual driving. The content of each mode will be exemplified below.

In the mode A, the state is automated driving, and the driver is tasked neither with monitoring the surroundings of the vehicle M nor with gripping the steering wheel 82 (hereinafter referred to as "steering gripping"). Surroundings monitoring includes at least monitoring in a traveling direction (for example, in front) of the vehicle M. Front means a space in the traveling direction of the vehicle M visually recognized through the front windshield. However, even in the mode A, the driver is required to be in a posture of being able to shift to manual driving quickly in response to a request from the system focusing on the automated driving control device 100. A term "automated driving" herein means that both the steering and the speed of the vehicle M are controlled independently of an operation of the driver. The mode A is, for example, a driving mode that can be executed when a condition is satisfied, such as that the vehicle M is traveling at a predetermined speed (for example, about 50 [km/h]) or less on a road dedicated to automobiles such as an expressway and there is a preceding vehicle to be followed, and it may also be referred to as a Traffic Jam Pilot (TJP) mode. The mode determiner 150 changes the driving mode of the vehicle M to the mode B when this condition is no longer satisfied.

In addition, during the execution of the mode A, the occupant can execute a second task. A second task is, for example, an action other than the driving of an occupant allowed during automated driving of the vehicle M. The second tasks include, for example, watching TV, using a terminal device (for example, a smartphone or a tablet terminal) possessed by an occupant (for example, talking on a phone, sending and receiving e-mails, using a social networking service (SNS), Web browsing, and the like), eating meals, and the like.

In the mode B, the state is driving assistance, and the driver is tasked with monitoring the surroundings of the vehicle M (hereinafter referred to as surroundings monitoring), but is not tasked with gripping the steering wheel 82. For example, in the mode B, the lane change of the vehicle M is performed based on a route setting to a destination or the like performed by the navigation device 50 according to determination by the vehicle system 1 side without receiving a lane change instruction from the occupant. A lane change means causing the vehicle M to move from a host lane in which the vehicle M is traveling to an adjacent lane adjacent to the host lane, and may include a lane change based on branching or merging. The vehicle system 1 is a driving subject in the modes A and B.

In the mode C, the state is driving assistance, and the driver is tasked with monitoring surroundings and gripping the steering wheel 82. For example, in the mode C, when the vehicle system 1 side determines that a lane change of the vehicle M is necessary, an inquiry is made to the occupant via the HMI 30, and driving assistance of executing a lane change is performed when an approval of the lane change by the occupant is received from the HMI 30 or the like. The lane change control in the mode B and the mode C is a lane change by a system subject.

The mode D is a driving mode in which a certain amount of driving operation by the driver is required for at least one of steering and acceleration or deceleration of the vehicle M. For example, in the mode D, driving assistance such as adaptive cruise control (ACC) and a lane keeping assist system (LKAS) is performed. In addition, in the mode D, when an instruction to cause the vehicle M to change lanes according to an operation of the blinker switch 32 by the driver is received, driving assistance of executing a lane change in an instructed direction is performed. The lane change in the mode D is, for example, a lane change according to an intention of the driver. The driver's operation of the blinker switch 32 is an example of a driving operation. In addition, a driving operation in the mode D may include a driving operation for controlling steering or acceleration or deceleration thereof.

In the mode E, both the steering and acceleration or deceleration of the vehicle M are in a manual driving state in which a driving operation of the driver is required. In both the mode D and the mode E, the task of monitoring the surroundings of the vehicle M is naturally imposed on the driver. A driving subject in the modes C to E is the driver.

The mode determiner 150 changes the driving mode of the vehicle M to a driving mode with a heavier task when a task related to the determined driving mode is not executed by the driver.

For example, during the execution of the mode A, when the driver is in a posture of not being able to shift to manual driving in response to a request from the system (for example, when the driver continues to look aside outside an allowable area, or when a sign indicating a difficulty in driving is detected), the mode determiner 150 causes the HMI controller 170 to execute control for prompting the driver to shift to manual driving in the mode E by using the HMI 30. In addition, when the driver does not respond even after a predetermined time has passed since the HMI controller 170 is caused to execute the control for prompting the shift to manual driving, or when it is estimated that the driver is not in a state for performing manual driving, the mode determiner 150 performs control such that the vehicle M is gradually decelerated while approaching a target position (for example, a shoulder of a road), and automated driving is stopped. In addition, after the automated driving is stopped, the vehicle M is in a state of the mode D or E, and the vehicle M can be started by a manual operation of the driver. In the following description, the same applies to "stop automated driving."

When the driver is not monitoring the front in the mode B, the mode determiner 150 prompts the driver to monitor the front by using the HMI 30, and performs control such that the vehicle M is brought closer to the target position and gradually stopped, and the automated driving is stopped if the driver does not respond. When the driver does not monitor the front or does not grip the steering wheel 82 in the mode C, the mode determiner 150 urges the driver to monitor the front and/or to grip the steering wheels 82 by using the HMI 30, and performs control such that the vehicle M is brought closer to the target position and gradually stopped, and the automated driving is stopped if the driver does not respond.

The driver state determiner 151 determines whether the occupant (driver) is in a state suitable for driving. For example, the driver state determiner 151 monitors the driver's state for the mode change described above, and determines whether the driver's state is a state corresponding to a task. For example, the driver state determiner 151 analyzes an image captured by the driver monitor camera 70 to perform posture estimation processing, and determines whether the driver is in a posture of not being able to shift to manual driving in response to a request from the system. In addition, the driver state determiner 151 analyzes the image captured by the driver monitor camera 70 to perform line-of-sight estimation processing, and determines whether the driver is monitoring the vicinity (more specifically, in front) of the vehicle M. When the driver state determiner 151 determines that the driver's state is not a state corresponding to a task for a predetermined time or longer, the driver state determiner 151 determines that the driver is in a state that is not suitable for performing the task. In addition, when it is determined that the driver's state is a state corresponding to a task, the driver state determiner 151 determines that the driver is in a state suitable for performing the task. Moreover, the driver state determiner 151 may determine whether the occupant is in a state in which a driver change is possible.

The first acquirer 152 acquires the first map information 54. In addition, the first acquirer 152 acquires reference information for identifying a position of a vehicle. The reference information is, for example, positional information of the vehicle M detected by the vehicle sensor 40 and an image captured by the camera 10. In addition, the reference information may include part or all of results of the recognition by the recognizer 130.

The identifier 153 refers to the first map information 54 on the basis of the positional information of the vehicle M identified based on the reference information, and acquires information on a road on which the vehicle M is traveling and information on a road on which the vehicle M is expected to travel in the future. The identifier 153 identifies a traveling lane of the vehicle M among one or more lanes included in the road on the basis of the acquired road information and the image captured by the camera 10. The identifier 153 may also determine whether the vehicle is traveling in a lane other than the rightmost or leftmost lane of the road when the road contains at least three lanes. In addition, the identifier 153 may determine whether the traveling lane of vehicle M is in an unidentified state, or whether the traveling lane of vehicle M is undefinable. Details of functions of the identifier 153 will be described below.

The section determiner 154 determines whether a first section in which the traveling lane of the vehicle M is undefinable among the one or more lanes included in the road identified by the identifier 153 is present within a first predetermined distance viewed from the vehicle M in the traveling direction of the vehicle M on the basis of the information on the road on which the vehicle M is traveling and the information on the road on which the vehicle M is expected to travel in the future. The first section is, for example, a road section having a different number of lanes from the number of lanes of the road on which the vehicle M is currently traveling. In addition, the section determiner 154 also determines whether a second section in which at least a road having three lanes branches is present within the first predetermined distance. The second section may be, for example, a section in which at least one of the respective branching lanes has a plurality of lanes. Moreover, the section determiner 154 may determine whether the first section and the second section are present continuously in the traveling direction. Moreover, the section determiner 154 may determine whether the first section and the second section are present in that order with respect to the traveling direction.

The mode change processor 155 determines the driving mode of the vehicle M on the basis of results of the determination by each of the driver state determiner 151 and the section determiner 154, a result of the identification by the identifier 153, and the like. In addition, the mode change processor 155 may determine to continue the driving mode being executed or to switch it to another mode. In addition, the mode change processor 155 performs various types of processing for changing to a driving mode determined by the mode determiner 150. For example, the mode change processor 155 instructs a driving assistance device (not shown) to operate, causes the HMI 30 to output information for prompting the driver to take an action from the HMI controller 170, or instructs to generate a target trajectory based on the action plan generator 140 according to the driving mode.

The second controller 160 controls the traveling drive force output device 200, the brake device 210, and the steering device 220 so that the vehicle M passes through a target trajectory generated by the action plan generator 140 at a scheduled time.

The second controller 160 includes, for example, a second acquirer 162, a speed controller 164, and a steering controller 166. The second acquirer 162 acquires information on a target trajectory (trajectory points) generated by the action plan generator 140 and stores it in a memory (not shown). The speed controller 164 controls the traveling drive force output device 200 or the brake device 210 based on a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes feedforward control according to a curvature of a road in front of the vehicle M and feedback control based on a deviation from the target trajectory in combination.

The HMI controller 170 notifies the occupant of predetermined information through the HMI 30. The predetermined information includes, for example, information related to traveling of the vehicle M such as information regarding a state of the vehicle M and information regarding driving control. The information regarding a state of the vehicle M includes, for example, the speed, an engine speed, a shift position, and the like of the vehicle M. In addition, the information regarding driving control includes, for example, an inquiry as to whether to perform a lane change, whether a driving mode is executed, information regarding a change in driving mode, information imposed on the occupant required to switch the driving mode (task request information for the occupant), information regarding a status of driving control (for example, content of an event being executed), and the like. In addition, the predetermined information may also include information that is not related to traveling control of the vehicle M, such as content (for example, movies) stored in a storage medium such as a TV program or DVD. Moreover, the predetermined information may include, for example, a current position or a destination of the vehicle M, information regarding a remaining amount of fuel, and information indicating whether the traveling lane of the vehicle M can be identified.

For example, the HMI controller 170 may generate an image containing the predetermined information described above, display the generated image on a display device of the HMI 30, generate a sound indicating the predetermined information, and cause a speaker of the HMI 30 to output the generated sound. In addition, the HMI controller 170 may output information received by the HMI 30 to the communication device 20, the navigation device 50, the first controller 120, and the like.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU controls the configuration described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second controller 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second controller 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second controller 160 or the information input from the driving operator 80, and changes the direction of the steering wheel.

[Driving Control of Vehicle M]

The driving control of the vehicle M according to a driving mode determined by the mode determiner 150 will be specifically described hereinafter. In the following description, it is assumed that the driver is in a state in which the driver is determined to appropriately perform a task imposed according to a driving mode by the driver state determiner 151, and an example in which the driving mode is determined on the basis of processing contents of the identifier 153 and the section determiner 154 will be described. When the driver state determiner 151 determines that the driver is not executing a task imposed according to a mode, the mode determiner 150 determines to change the driving mode to a mode according to a task that the driver is executing, or determines to perform control to stop the automated driving.

Figure 4:
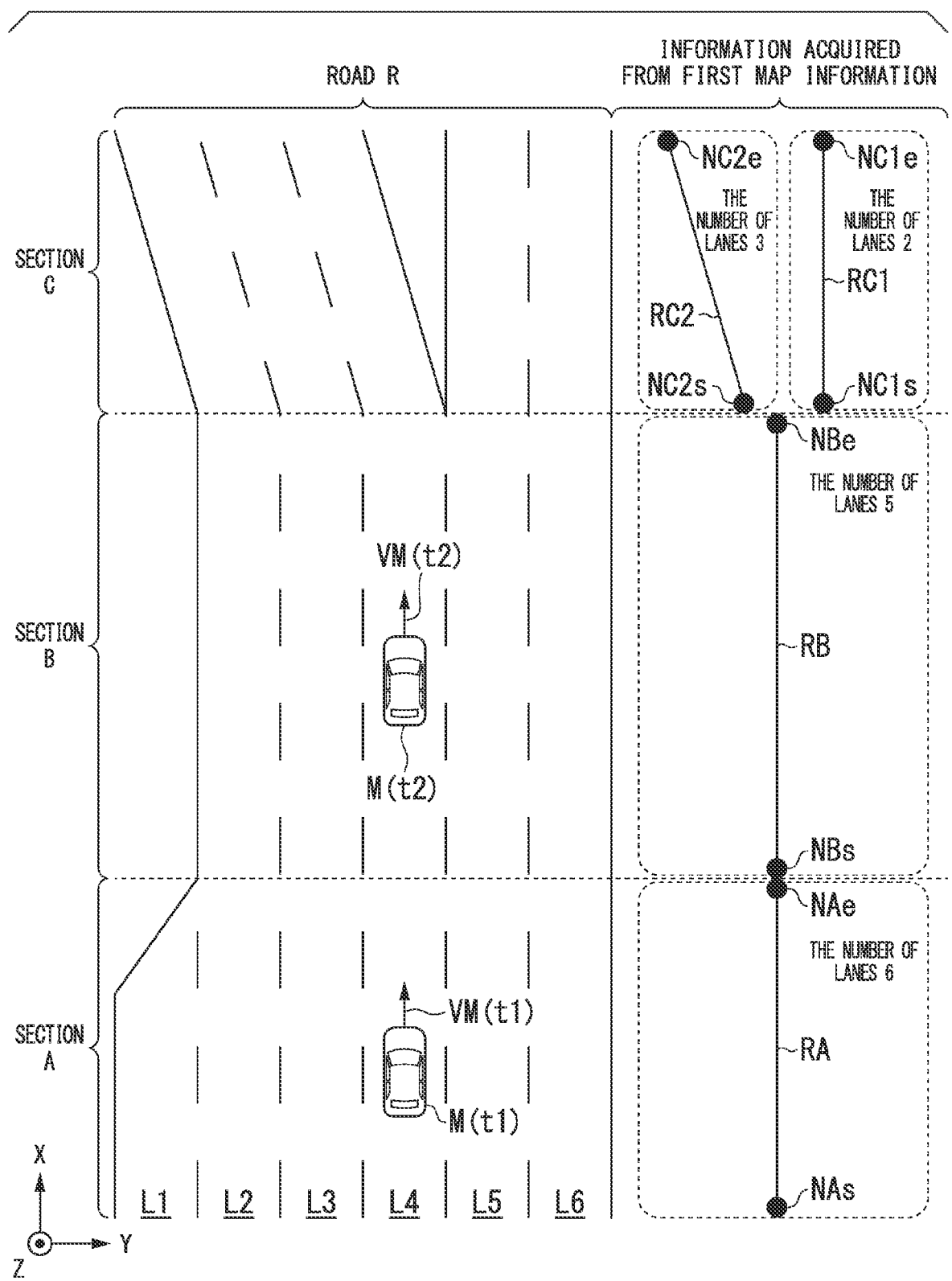
FIG. 4 is a diagram for describing driving control of the vehicle M according to the embodiment.

FIG. 4 is a diagram for describing the driving control of the vehicle M according to the embodiment. FIG. 4 shows an example in which the vehicle M is traveling on a road R at a speed VM. In the example of FIG. 4, it is assumed that time passes in order of times t1 and t2, and the position and the speed of the vehicle M at a time t* are represented by M(t*) and VM(t*). The road R has predetermined road sections (for example, sections A to C) in an extending direction thereof. The road R (the sections A to C) is, for example, an expressway. Each section may be separated by, for example, road shape change points (for example, branching, merging, curved roads, or presence of tunnels), or may be separated by a predetermined length. A section B shown in FIG. 4 is a section in which the number of lanes is reduced by one compared to a section A. In addition, a section C is a specific branch section. The section B is an example of the first section, and the section C is an example of the second section. Lanes L1 to L6 in the section A, lanes L2 to L6 in the section B, and lanes L5 to L6 in the section C are lanes that enable traveling in an X-axis direction in FIG. 4.

The automated driving control device 100 executes automated driving such that the vehicle M travels along a route on a map on the basis of, for example, the information acquired from the first map information 54 as described above and the traveling lane of the vehicle M identified by the identifier 153. For example, the identifier 153 refers to the first map information 54 on the basis of reference information acquired by the first acquirer 152, and acquires road information including a position where the vehicle M is present, and map information of the road on which the vehicle M is expected to travel in the future. The first map information 54 stores node information, link information, and the number of lanes for each of the road sections A to C, as shown in FIG. 4. For example, the identifier 153 acquires a start point, an end point, and a road shape of the section A by nodes NAs and NAe and a link RA and acquires that the number of lanes is six according to the first map information 54. Similarly, it acquires information on a road in the section B by nodes NBs and NBe and a link RB, and recognizes that the number of lanes is five. The identifier 153 acquires that the section C is a section that branches into two, and acquires information on the respective branching roads by nodes NC1s, NC1e, NC2s, and NC2e and links RC1 and RC2, and the number of lanes.

Next, the identifier 153 identifies the traveling lane of the vehicle M among one or more lanes included in the road R at a predetermined timing using at least one of several identification methods shown below. The predetermined timing may be, for example, a predetermined period, a timing when the vehicle M has entered the expressway, a timing when the road section is switched in the first map information 54, or a timing when the traveling lane of the vehicle M has not been identified and there is no road change within the second predetermined distance. The identifier 153 identifies the traveling lane of the vehicle M on the basis of the type information of road lane markings obtained from the image captured by the camera 10 (one or both of the first camera and the second camera if they are present), the information of a target for which a lane position can be identified, or the like.

[First Identification Method]

Figure 5:
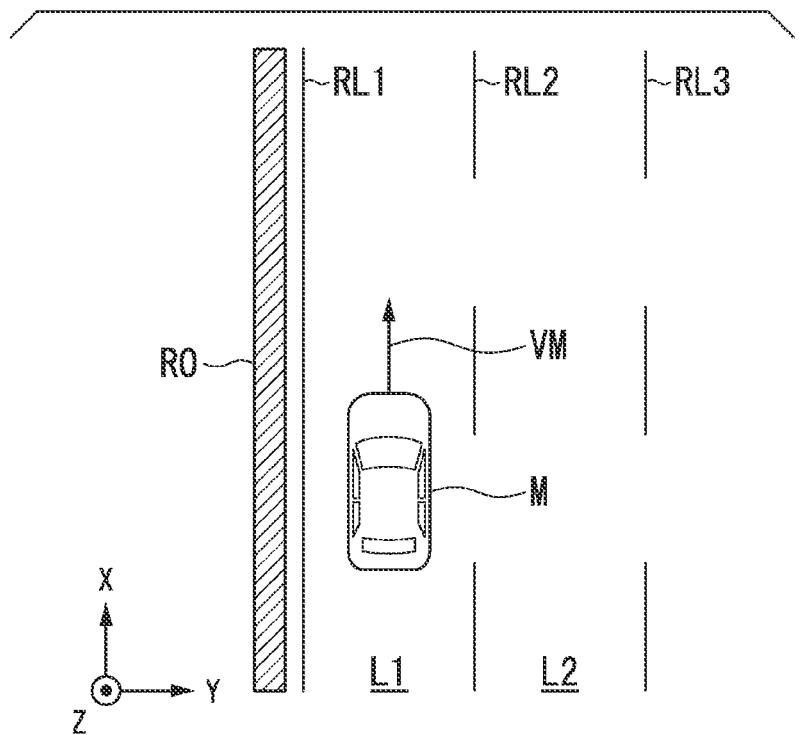
FIG. 5 is a diagram for describing a first identification method of a traveling lane.

FIG. 5 is a diagram for describing a first identification method of the traveling lane. In an example of FIG. 5, lanes L1 and L2 portions of the lanes included in the road R shown in FIG. 4 are mainly shown. A lane L1 is marked with road lane markings RL1 and RL2 and a lane L2 is marked with road lane markings RL2 and RL3. In the example of FIG. 5, a road structure RO such as a road shoulder, a guardrail, and a fence is provided along the extending direction of the lane marking RL1 on an outer side than the road lane marking RL1 as viewed from the vehicle M. The road structure RO is an example of a target for which a vehicle application position can be identified.

The identifier 153 analyzes the image captured by the camera 10, extracts edge points with a large luminance difference from adjacent pixels in the image, and connects the edge points to recognize a road lane marking on the image plane. For example, the identifier 153 recognizes left and right road lane markings RL1 and RL2 closest to the vehicle M. In addition, the identifier 153 extracts image information by performing feature extraction, image enhancement processing, and the like on the image, refers to the extracted image information, a predefined pattern matching model, and the like, and recognizes the road structure RO by performing matching processing. Then, the identifier 153 identifies a lane marked with the lanes RL1 and RL2 as the traveling lane of the vehicle M. Moreover, the identifier 153 identifies the traveling lane of the vehicle M as being the leftmost lane among the one or more lanes included in the road R when the road structure RO is on the outer side than the lane RL1 (a lane on a left side of the vehicle M) as viewed from the vehicle M, and a distance between the lane RL1 and the road structure RO is within a third predetermined distance. Moreover, the identifier 153 identifies the traveling lane of the vehicle M as being the rightmost lane on the road R when the road structure RO is on an outer side than the lane RL2 (a lane on a right side of the vehicle M) as viewed from the vehicle M and is within the third predetermined distance from the lane RL2.

[Second Identification Method]

Figure 6:
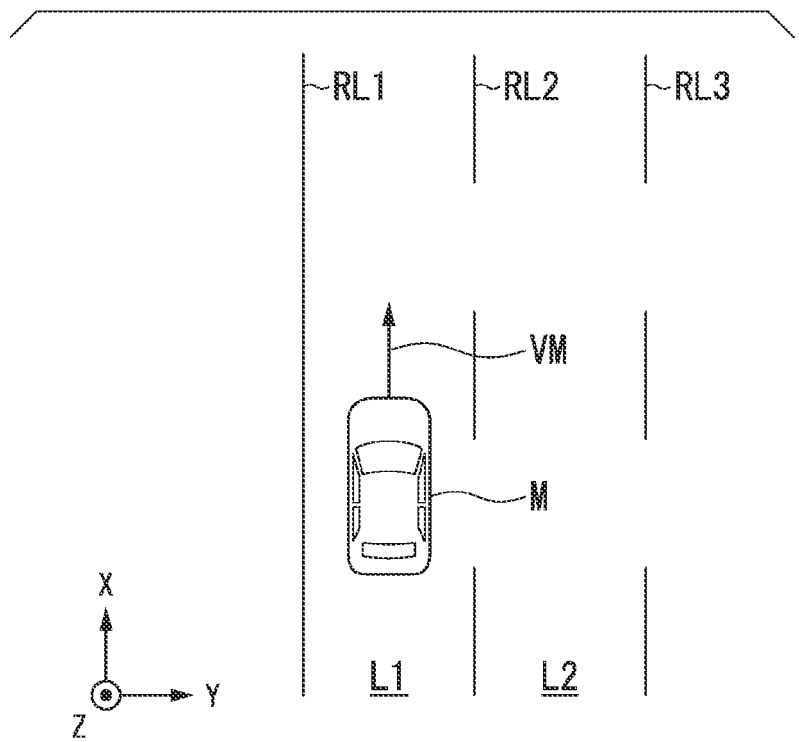
FIG. 6 is a diagram for describing a second identification method of the traveling lane.

FIG. 6 is a diagram for describing a second identification method of the traveling lane. In an example of FIG. 6, the road conditions are different from the road conditions of FIG. 5 in that there is no road structure RO. In the second identification method, the identifier 153 analyzes the image captured by the camera 10, and recognizes types of the road lane markings RL1 and RL2 (for example, line types and colors such as a solid line and a dashed line) that mark the traveling lane of the vehicle M among the road lane markings traveling along the traveling lane of the vehicle M on the basis of a result of the analysis. Then, when one of the road lane markings RL1 and RL2 is a solid line and the other is a dashed line, the identifier 153 determines that the vehicle M is traveling in the most-edge lane among one or more lanes included in the road on which the vehicle M travels. For example, when the lane RL1 on the left side of the vehicle M is a solid line and the lane RL2 on the right side of the vehicle M is a dashed line, the identifier 153 identifies the traveling lane of the vehicle M as being the leftmost lane of the road R. In addition, the identifier 153 identifies the traveling lane of the vehicle M as being the rightmost lane when the lane RL1 is a dashed line and the lane RL2 is a solid line. Moreover, the identifier 153 may recognize whether a road lane marking is a central line (a lane for distinguishing between a lane that can travel in the same direction and an opposite lane) on the basis of the color of the road lane marking.

[Third Identification Method]

Figure 7:
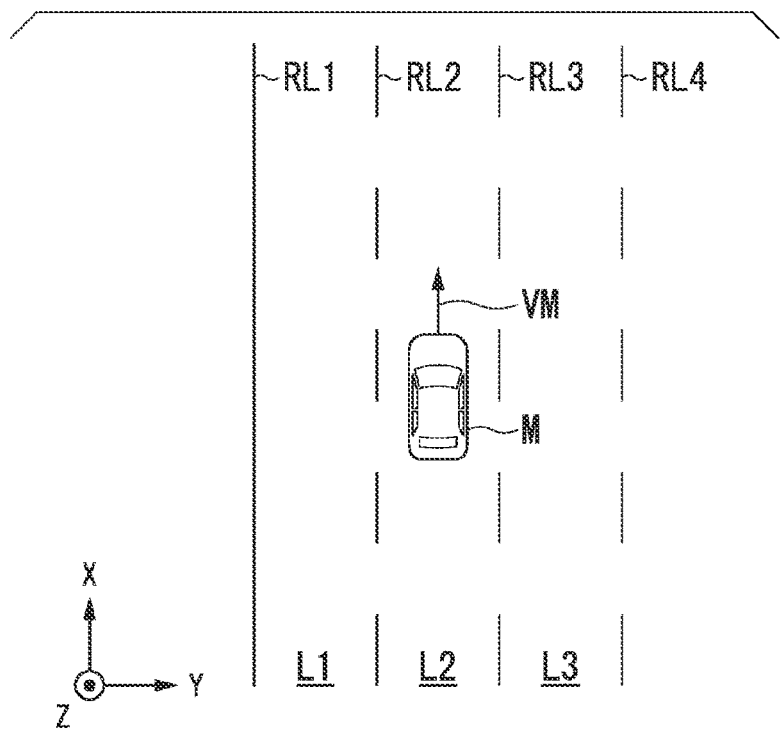
FIG. 7 is a diagram for describing a third identification method of the traveling lane.

FIG. 7 is a diagram for describing a third identification method of the traveling lane. In the example of FIG. 7, only lanes L1 to L3 of the lanes included in the road shown in FIG. 4 are shown. A lane L3 is marked with road lane markings RL3 and RL4. The identifier 153 analyzes the image captured by the camera 10, recognizes road lane markings RL1 to RL4 around the vehicle M on the basis of a result of the analysis, and recognizes line types of the road lane markings. In this case, the identifier 153 distinguishes between the road lane markings RL2 and RL3 that mark a lane in which the vehicle M travels and road lane markings RL1 and RL4 that mark adjacent lanes of the traveling lane, and recognizes the respective types.

The identifier 153 identifies the traveling lane of the vehicle M as being the second lane from the leftmost lane among the one or more lanes included in the road when the road lane markings RL2 and RL3 marking the traveling lane of the vehicle M are dashed lines and the next road lane marking RL1 present on the outer side than the road lane marking RL2 as viewed from the vehicle M is a solid line. The identifier 153 identifies the traveling lane of the vehicle M as being the second lane from the rightmost lane among one or more lanes when a lane on an outer side than the road lane marking RL3 as viewed from the vehicle M is a solid line.

[Fourth Identification Method]

Figure 8:
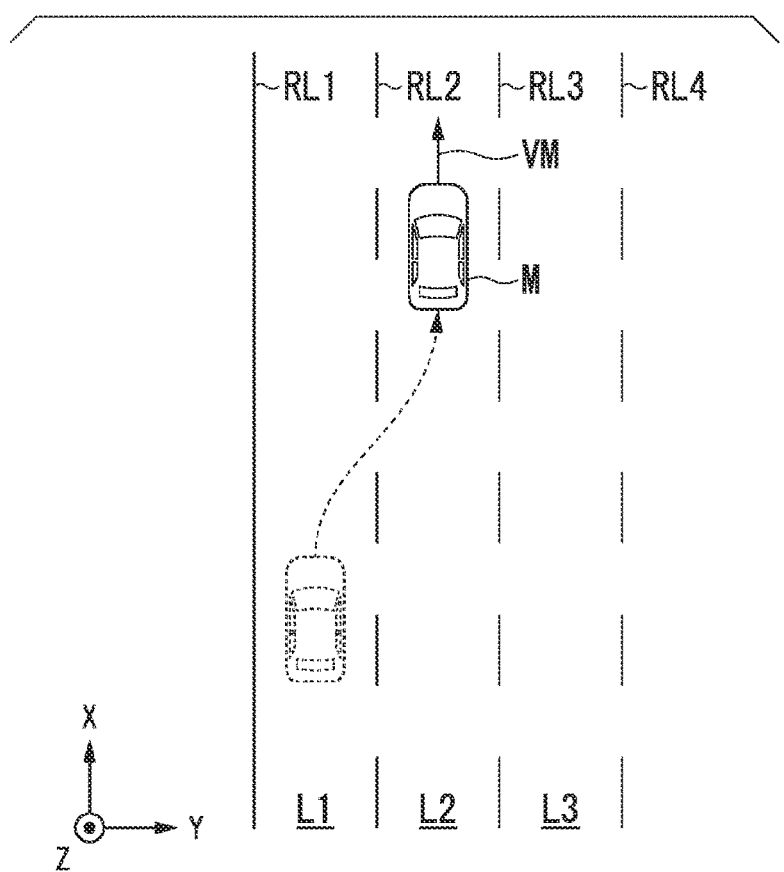
FIG. 8 is a diagram for describing a fourth identification method of the traveling lane.

FIG. 8 is a diagram for describing a third identification method of the traveling lane. In an example of FIG. 8, the lanes L1 to L3 are shown as in FIG. 7. The identifier 153 identifies the traveling lane of the vehicle M on the basis of the number and a direction of lane changes of the vehicle M when the traveling lane of the vehicle M can be identified by the first to third identification methods described above. In the example of FIG. 8, it is assumed that the vehicle M can be identified as traveling in the lane L1 (the leftmost lane). The identifier 153 identifies the traveling lane of the vehicle M as being the second lane L2 from the leftmost lane when it recognizes that the vehicle M has changed lanes to the lane L2, which is an adjacent lane on the right, from this state. Note that the identifier 153 may recognize the direction of the lane change by recognizing a traveling situation in which the vehicle M has moved across a lane on the basis of the image captured by the camera 10. In addition, the identifier 153 recognizes the direction indicated by an operation of the blinker switch 32, and when a steering angle detected by the steering angle sensor becomes a predetermined angle or more after the operation of the blinker switch 32 is received, it may also recognize the direction of the lane change on the basis of the indicated direction of the blinker switch 32 and a direction in which the steering angle increases.

Furthermore, the identifier 153 identifies the traveling lane of the vehicle M as being the lane L3 (a third lane from the rightmost) by recognizing a lane change from the lane L2 to the lane L3, which is an adjacent lane on the right. In addition, the identifier 153 identifies the traveling lane of the vehicle M as being the lane L1 (the rightmost lane) by recognizing a lane change from the lane L2 to the lane L1, which is an adjacent lane on the left.

[Fifth Identification Method]

In the fifth identification method, the identifier 153 identifies the traveling lane of the vehicle M by moving the vehicle M to the rightmost or leftmost lane of the road by lane change when the traveling lane of the vehicle M has not been identified (undefined) among one or more lanes included in the road. In this case, the identifier 153 may acquire the number and direction of lane changes when the lane is changed to the rightmost or leftmost lane, and perform control to return the vehicle M to an original lane by performing the same number of lane changes in a direction opposite to the acquired direction. As a result, even when the traveling lane of the vehicle M cannot be identified, it is possible to identify the traveling lane of the vehicle M. In addition, in the fifth identification method, the number of lane changes of the traveling lane may increase as the number of lanes increases. Therefore, the identifier 153 may execute the fifth identification method when the first section or second section described above is not present within the first predetermined distance from a current position of the vehicle M. The first predetermined distance may be increased as, for example, the number of lanes of the road on which the vehicle is traveling increases, or may be a fixed distance. As a result, it is possible to perform control to identify the traveling lane of the vehicle M in a safer traveling environment.

Returning to FIG. 4, it is assumed that the vehicle M (t1) has its traveling lane identified using at least one of the identification methods described above, automated driving in the first driving mode is executed thereon on the basis of a position of the vehicle M in the identified traveling lane, and the vehicle is traveling in a lane L4 at a speed VM (t1) at a time t1. Here, the first map information 54 is not, for example, a high-precision map (second map information which will be described below) including detailed road information (for example, a center, a width, a slope, and curvature of a lane, a road type, route information, and the like) for each lane included in the road. In addition, even when road lane markings are recognized using the image captured by the camera 10, it may not be possible to recognize road lane markings of adjacent lanes or may not be possible to recognize road lane markings of lanes on an outer side than the adjacent lanes as viewed from the vehicle M due to effects of an image-capturing range of the camera, accuracy of the camera, a shooting environment, and the like. Therefore, for example, when the vehicle M travels from the section A to the section B, the identifier 153 can recognize from the first map information 54 that the number of lanes of the road R has decreased, but it may not be possible to recognize which of the lanes L1 to L6 has decreased depending on the traveling position of the vehicle M.

Figure 9:
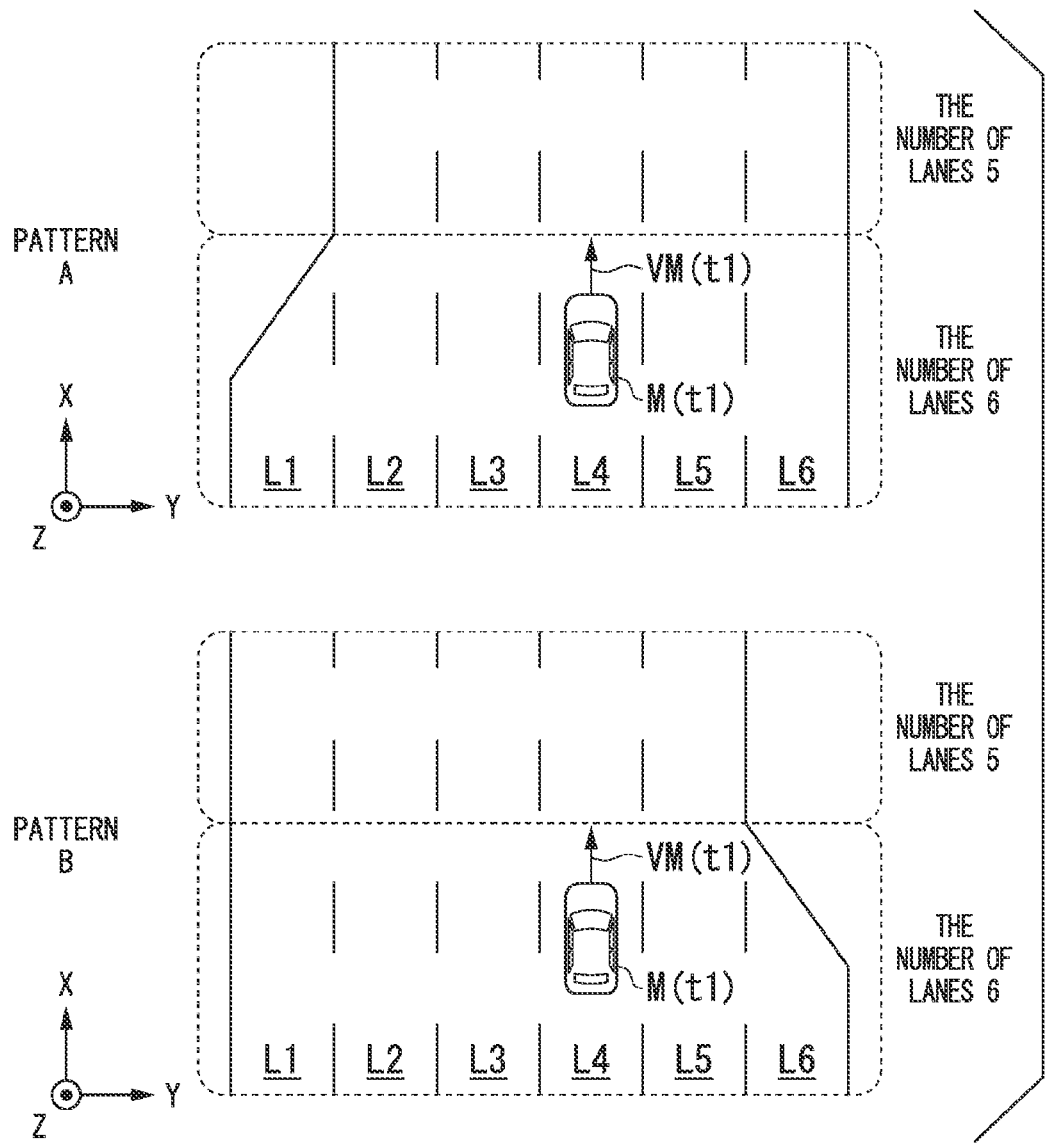
FIG. 9 is a diagram for describing a pattern in which lanes decrease.

FIG. 9 is a diagram for describing a pattern in which lanes are decreased. In an example of FIG. 9, two patterns (patterns A and B) when 6 lanes are switched to 5 lanes are shown. For example, when the vehicle M is traveling in the lane L4, it is not possible to recognize whether the lane L1 is decreased like a pattern A or the lane L6 is decreased like a pattern B with only information acquired from the first map information 54. Therefore, when the vehicle M travels in the section B at a time t2, except for a case where the fifth identification method described above is executed, it is not possible to accurately identify which numberth lane from the leftmost or rightmost lane the vehicle M is traveling. This also applies to a case when the vehicle M travels in lanes L2 to L5 other than the leftmost or rightmost lane of the road having at least three lanes. In addition, the phenomenon described above also applies to a case when the number of lanes in a next road section increases rather than the number of lanes in a currently traveling road section.

Even if it is not possible to identify which lane the vehicle M is traveling in, if left and right road lane markings of the vehicle M can be recognized based on the image captured by the camera 10, automated driving such as LKAS can be executed along a lane marked with the road lane marking. However, if there is a specific branch section such as the section C further ahead, it may not be possible to recognize which branch destination the current traveling lane is connected to, and there occurs a possibility that the vehicle cannot travel in a direction of the destination. In addition, if a connection destination of the section C cannot be recognized, a road shape in the section C cannot be recognized, and thus even when it is necessary to decelerate the vehicle M in front of a curved road, automated driving may not be able to cope with it in some cases.

FIG. 10 is a diagram for describing an example of a pattern in which lane identification is not possible when there are an increase or decrease in the number of lanes and a specific branch. In FIG. 10, the number of lanes of a road on which the vehicle is traveling, an increase or decrease in the number of lanes, a type of the specific branch, and a lane unidentifiable pattern are associated with each other. For example, when the road on which the vehicle M travels has three lanes and the number of lanes in a section ahead increases to four, there is a possibility that two lanes excluding lanes at both ends cannot be identified (can be undefinable). For this reason, when there is a specific branch section further ahead, there is a possibility that driving control in the first driving mode cannot be performed appropriately. Such a phenomenon also applies to other patterns as shown in FIG. 10.

Therefore, when the vehicle M is in the first driving mode and the first section and the second section are present within the first predetermined distance from the vehicle M in the traveling direction of the vehicle M, the mode determiner 150 performs driving control to switch from the first driving mode to the second driving mode. More specifically, the section determiner 154 first determines whether the first section and the second section are continuously present within the first predetermined distance in the traveling direction of the vehicle M. Then, when the section determiner 154 determines that the first section and the second section are continuously present within the first predetermined distance, the mode change processor 155 switches the first driving mode (a mode A or a mode B) currently being executed to the second driving mode (a mode C, a mode D, a mode E).

Moreover, the mode change processor 155 continues the first driving mode when the first driving mode is being executed and only one of the first section and the second section is present within the first predetermined distance in the traveling direction of the vehicle M. This is because driving control such as LKAS is possible if road lane markings of the traveling lane can be recognized even if the traveling lane of the vehicle M cannot be identified among one or more lanes included in the road, and an appropriate lane change or the like can be performed even if a specific branch section is present ahead when the traveling lane of the vehicle M can be identified. In this manner, the mode determiner 150 can clarify conditions under which the first driving mode cannot be continued, and can change to a safer driving mode in the section that satisfies the conditions.

In addition, the mode change processor 155 switches from the first driving mode to the second driving mode at a timing before the vehicle M enters the second section when the section determiner 154 determines that the first section and the second section are present within the first predetermined distance in the traveling direction before the vehicle M travels through the first section (for example, the time t1 in FIG. 4) or while the vehicle M travels through the first section (for example, the time t2 in FIG. 4). A timing before entering the second section is a timing when the vehicle M has reached at a position a fourth predetermined distance before an end point of the first section (a node NBe in FIG. 4) or a starting node of the second section (NC1s, NC2s in FIG. 4). The fourth predetermined distance is an estimated distance during which the vehicle M can be positioned in an intended branch destination lane in the second driving mode. The fourth predetermined distance may be determined according to, for example, the number of lanes of the road on which the vehicle M is traveling obtained from the first map information 54, the number of lanes in the first section, and the number of lanes in the second section. As a result, it is possible to prepare for traveling in the second section by causing the occupant to monitor the surroundings and to perform steering gripping and the like at an appropriate timing before reaching the second section. For example, when the second section is a curved road and it is necessary to decelerate the vehicle M before the curved road, appropriate deceleration control can be performed by automated driving.

In addition, the mode change processor 155 may continue the first driving mode when the first section continues (for example, when the number of lanes increases from 4 to 5 and then returns to 4), and when a distance from the first section to the second section is a fifth predetermined distance or more while the first driving mode is executed. This is because, even if the first section is continuous and the number of lanes increases or decreases, driving control such as LKAS can be continued if the road lane markings of the traveling lane can be recognized. Instead of continuing the first driving mode, the mode change processor 155 may switch to a driving mode (for example, the mode C) in which a task imposed on the occupant is light in the second driving mode. As a result, driving control with a high degree of automation can be continued, and the driving mode can be switched at a more appropriate timing.

In addition, instead of (or in addition to) the driving mode switching determination described above, the mode change processor 155 may switch from the first driving mode to the second driving mode when, for example, the vehicle M traveling in the first driving mode has the first section and the second section within a predetermined distance and when the vehicle M is traveling in a lane other than the rightmost or leftmost lane of a road having at least three lanes in the first section, and may also continue the first driving mode when the vehicle M is traveling in the rightmost or leftmost lane.

Moreover, the mode change processor 155 does not have to switch from the first driving mode to the second driving mode when, for example, even if the second section is present within a predetermined distance from the vehicle M in a state in which the traveling lane of the vehicle M when traveling in the first section is not identified by the identifier 153 while the first driving mode is executed, a branch destination road of the second section on which the vehicle M travels can be identified. For example, even in a state in which it is not identified (undefined) which lane the vehicle M is traveling in between two adjacent lanes, when it can be identified that the two lanes are both connected to the same branch destination of the second section, it is possible to continue the driving mode with a high degree of automation by continuing the first driving mode as it is.

The HMI controller 170 generates information prompting the occupant of the vehicle M to execute a task according to the driving mode and causes the HMI 30 to output the generated information when the driving mode executed by the vehicle M is switched from the first driving mode to the second driving mode. For example, the HMI controller 170 generates an image showing specific contents of the task to be executed by the occupant, and causes a display device of the HMI 30 to output the generated image. In addition, the HMI controller 170 may generate audio data associated with the image information and cause a speaker of the HMI 30 to output the generated data. Moreover, the HMI controller 170 may output an alarm or the like to notify the occupant that it is necessary to switch to the second driving mode. This allows the occupant to ascertain that the driving mode will be changed and that a predetermined task will be imposed on the occupant, and to prepare for switching the driving mode. Moreover, when the driving mode executed by the vehicle M is switched from the second driving mode to the first driving mode, the HMI controller 170 may also cause the HMI 30 to output information indicating the changed driving mode and that the task imposed on the occupant will be changed (become lighter) to the occupant of the vehicle M.

[Processing Flow]

Next, a flow of processing executed by the automated driving control device 100 of the embodiment will be described. In the following description, among types of processing executed by the automated driving control device 100, processing of switching the driving mode depending on whether the first section and the second section are present in the traveling section of the vehicle M will be mainly described. In addition, processing of this flowchart may be, for example, repeatedly executed at predetermined timings. Moreover, the processing will be divided into two types of driving control processing based on the traveling section (first driving control processing and second driving control processing) and described in the following description.

[First Driving Control Processing]

Figure 11:
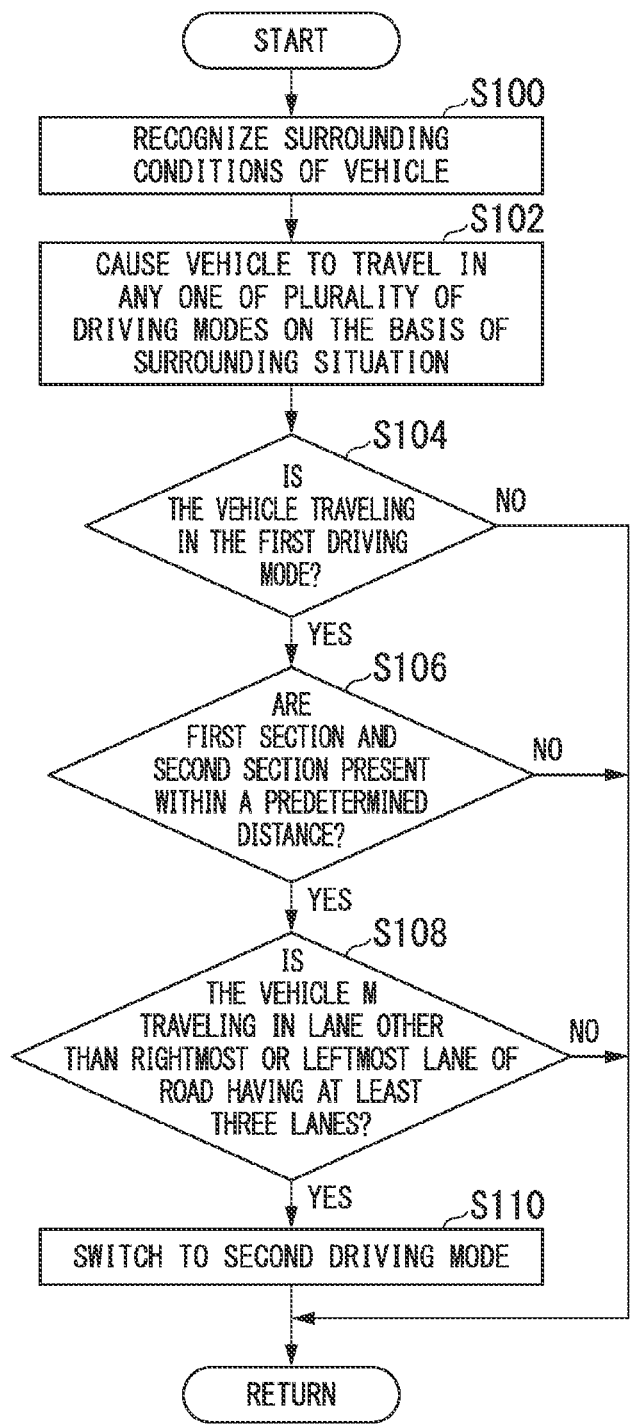
FIG. 11 is a flowchart which shows an example of a flow of first driving control processing executed by an automated driving control device 100.

FIG. 11 is a flowchart which shows an example of a flow of first driving control processing executed by the automated driving control device 100. In the example of FIG. 11, the recognizer 130 recognizes the surrounding situation of the vehicle M (step S100). Next, the mode determiner 150 causes the vehicle to travel in any one of the plurality of driving modes set in advance on the basis of the surrounding situation (step S102).

Next, the mode determiner 150 determines whether the vehicle M is traveling in the first driving mode (step S104). When it is determined that the vehicle M is traveling in the first driving mode, the section determiner 154 determines whether the first section and the second section are present within a predetermined distance in the traveling direction from a current position of the vehicle M (step S106). When it is determined that the first section and the second section are present within the predetermined distance, the mode determiner 150 determines whether the vehicle M is traveling in a lane other than the rightmost or the leftmost lane of a road having at least three lanes (step S108). When it is determined that the vehicle is traveling in a lane other than the rightmost or leftmost lane, the mode change processor 155 performs control to switch the driving mode of the vehicle M from the first driving mode to the second driving mode (step S110). As a result, processing of this flowchart will end.

In addition, when it is determined in the processing of step S104 that the vehicle is not traveling in the first driving mode, when it is determined in the processing of step S106 that the first section and the second section are not present within the predetermined distance, or even when it is determined in the processing of step S108 that the vehicle is not traveling in a lane other than the rightmost or the leftmost lane of a road having at least three lanes, the processing of this flowchart will end. Therefore, for example, when either the first section or the second section is present within the predetermined distance in the processing of step S106, the first driving mode is continuously executed.

In the embodiment, when it is determined in the processing of step S106 that the first section and the second section are present within the predetermined distance, the processing of step S110 (switching from the first driving mode to the second driving mode) may be performed without performing the processing of step S108.

[Second Driving Control Processing]

Figure 12:
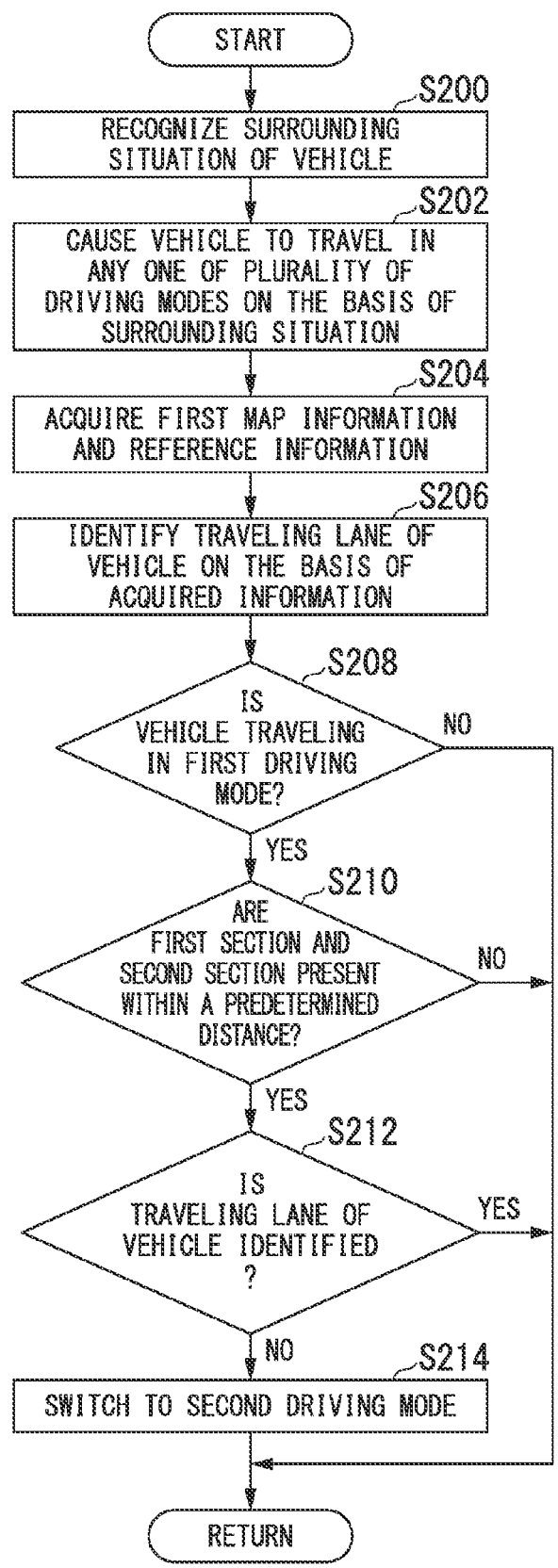
FIG. 12 is a flowchart which shows an example of a flow of second driving control processing executed by the automated driving control device 100.

FIG. 12 is a flowchart which shows an example of a flow of second driving control processing executed by the automated driving control device 100. In the example of FIG. 12, the recognizer 130 recognizes the surrounding situation of the vehicle M (step S200). Next, the mode determiner 150 causes the vehicle M to travel in any one of the plurality of driving modes set in advance on the basis of the surrounding situation (step S202).

Next, the mode determiner 150 acquires first map information and reference information for identifying the position of the vehicle M (step S204), and identifies the traveling lane of the vehicle on the basis of the acquired information (step S206). Next, the mode determiner 150 determines whether the vehicle M is traveling in the first driving mode (step S208). When it is determined that the vehicle M is traveling in the first driving mode, the section determiner 154 determines whether the first section and the second section are present within a predetermined distance in the traveling direction from the current position of the vehicle M (step S210). When it is determined that the first section and the second section are present within the predetermined distance, the identifier 153 determines whether the traveling lane of the vehicle M is identified among one or more lanes included in a road on which the vehicle M travels (step S212). When it is determined that the traveling lane of the vehicle M is not identified (undefined), the mode change processor 155 performs control to switch the driving mode of the vehicle M from the first driving mode to the second driving mode (step S214). As a result, the processing of this flowchart will end.

Further, when it is determined in the processing of step S208 that the vehicle is not traveling in the first driving mode, when it is determined in the processing of step S210 that the first section and the second section are not present within the predetermined distance, or even when it is determined in the processing of step S212 that the traveling lane of the vehicle M is identified, the processing of this flowchart will end.

According to the embodiment described above, the vehicle control device includes the recognizer 130 that recognizes the surrounding situation of the vehicle M and the driving controller (the action plan generator 140 and the second controller 160) that controls one or both of the steering and speed of the vehicle M on the basis of the surrounding situation recognized by the recognizer 130, in which the driving controller causes the vehicle M to travel by executing any one of a plurality of driving modes including at least a first driving mode and a second driving mode in which a task imposed on an occupant of the vehicle M is heavier than in the first driving mode, and switches from the first driving mode to the second driving mode when a first section in which the number of lanes of a road on which the vehicle M travels is different from the current number of lanes and a second section in which a road having at least three lanes branches are present within a predetermined distance in the traveling direction of the vehicle M while the first driving mode is executed, and thereby it is possible to change a control degree of driving control in a more appropriate situation. In addition, according to the present embodiment, even if the vehicle M is not equipped with high-precision map information, it is possible to identify the position (the traveling lane) of the vehicle M and to continue execution of the first driving mode using a navigation map (the first map information 54) as used in the navigation device 50. As a result, unlike high-precision maps, there is no need to update map information from time to time or to manage it with a map server and the like, and thus it is possible to reduce operating costs.

Furthermore, according to the embodiment, for example, when the vehicle M cannot identify (loses) the position of the traveling lane, and a specific branch is present within a predetermined distance after the vehicle becomes unable to identify (lost) the position, a section in which the first driving mode cannot be executed or continued is clarified by performing control such that the first driving mode is not executed, and it is possible to intentionally switch from the first driving mode to the second mode, so that the occupant can take turns driving more safely. Moreover, according to the embodiment, for example, in a situation where a high-precision map cannot be used, a limit scene in which the traveling lane of the vehicle M cannot be identified is clarified, and it is possible to increase the number of sections in which automated driving can be executed without using a high-precision map on a road dedicated to automobiles such as an expressway.

Modified Example

In the embodiment described above, when map information (second map information) with higher accuracy than the first map information is held, in addition to the first map information 54, if the second map information cannot be acquired, the traveling lane may be identified using the first map information 54 or the image captured by the camera 10, and control to continue the first driving mode on the basis of the identified information may be performed.

The second map information is, for example, map information in which road information is defined for each lane in a section shorter than in the first map information. In addition, the second map information may also include, for example, lane center information, lane boundary information, or the like. Moreover, the second map information may include road information, traffic regulation information, address information (address and zip code), facility information, telephone number information, and the like. The second map information may be updated at any time by the communication device 20 communicating with other devices. The second map information may be held in a storage device such as an HDD or a flash memory of the MPU 60, or may be stored in the storage 180.

For example, when the second map information is held in the MPU 60 or the storage 180, the recommended lane determiner 61 divides a route on a map provided from the navigation device 50 into a plurality of blocks, and determines a recommended lane for each block with reference to the second map information. In this case, the recommended lane determiner 61 may use the lane information included in the second map information to determine which numberth lane from the left the vehicle M will travel.

Here, for example, when the vehicle M is executing the first driving mode and the second map information cannot be used due to an abnormality in data of the second map information or an influence during updating of the second map information or an abnormality or the like during updating, the mode determiner 150 continues the first driving mode on the basis of the information acquired from the first map information 54. As a result, even if the second map information cannot be used, it is possible to execute a driving mode with a high degree of automation.

In the embodiment, when the driving mode is switched from the first driving mode to the second driving mode, the mode determiner 150 may determine to which of the plurality of modes included in the second driving mode the driving mode should be switched according to a traveling state and a traveling environment of the vehicle M. The traveling state is, for example, a state of the driver determined by the driver state determiner 151. The traveling environment includes, for example, a shape of a road around the vehicle M, the number of surrounding vehicles, the number of lanes in the first section or the second section, the number of branches, and the like. For example, when conditions for switching from the first driving mode to the second driving mode are satisfied, the mode determiner 150 determines to switch to the mode C when the number of lanes in the first section is three, determines to switch to the mode D when the number of lanes is four, and determines to switch to the mode E when the number of lanes is five or more. In addition, the mode determiner 150 determines to switch to the mode D when the road branches into two in the second section, and determines to switch to the mode E when the road branches into three or more. As a result, it is possible to cause the vehicle M to travel in a more appropriate mode according to the traveling state and the traveling environment.

The embodiments described above can be expressed as follows.

A vehicle control device includes a storage device that has stored a program, and a hardware processor, in which the hardware processor executes the program, thereby recognizing a surrounding situation of a vehicle, controlling one or both of steering and speed of the vehicle on the basis of the recognized surrounding situation, causing the vehicle to travel by executing any one of a plurality of driving modes including at least a first driving mode and a second driving mode in which a task imposed on an occupant of the vehicle is heavier than in the first driving mode, and switching from the first driving mode to the second driving mode when a first section in which the number of lanes of a road on which the vehicle travels is different from the current number of lanes and a second section in which a road having at least three lanes branches are present within a predetermined distance in a traveling direction of the vehicle while the first driving mode is executed.

Although a mode for carrying out the present invention has been described above using the embodiment, the present invention is not limited to the embodiment, and various modifications and substitutions can be made within a range not departing from the gist of the present invention.

REFERENCE SIGNS LIST

1 Vehicle system
10 Camera
12 Radar device
14 LIDAR
16 Object recognition device
20 Communication device
30 HMI 32 Blinker switch
40 Vehicle sensor
50 Navigation device
60 MPU
70 Driver monitor camera
80 Driving operator
82 Steering wheel
84 Steering grip sensor
100 Automated driving control device
120 First controller
130 Recognizer
140 Action plan generator
150 Mode determiner
151 Driver state determiner
152 First acquirer
153 Identifier
154 Section determiner
155 Mode change processor
160 Second controller
162 Second acquirer
164 Speed controller
166 Steering controller
170 HMI controller
180 Storage
200 Traveling drive force output device
210 Brake device
220 Steering device

What is claimed is:

1. A vehicle control device comprising:
a recognizer configured to recognize a surrounding situation of a vehicle;
a driving controller configured to control one or both of steering and a speed of the vehicle on the basis of the surrounding situation recognized by the recognizer;
an acquirer configured to acquire first map information including lane information around a vehicle and reference information for identifying a position of the vehicle; and
an identifier configured to identify a traveling lane of the vehicle among one or more lanes included in a road on which the vehicle travels from the first map information on the basis of the reference information acquired by the acquirer,
wherein the driving controller causes the vehicle to travel by executing any one of a plurality of driving modes including at least a first driving mode in which a task of gripping an operator that receives a steering operation of the vehicle is not imposed on an occupant of the vehicle and a second driving mode in which a task imposed on the occupant is heavier than in the first driving mode and a task of gripping the operator is imposed on the occupant, executes the first driving mode when a traveling lane of the vehicle is identified by the identifier, switches from the first driving mode to the second driving mode when a first section in which a traveling lane of the vehicle is undefinable by the identifier and a second section having a fork having at least three branching lanes within a predetermined distance in the traveling direction of the vehicle, and changes lanes in the second driving mode to a lane in the first section in which the traveling lane of the vehicle is identifiable when the traveling lane of the vehicle is not identifiable and does so whether or not there is a lane increase in the first section.

2. The vehicle control device according to claim 1, wherein the first section is a road section in which the number of lanes is different from the number of lanes of a road on which the vehicle is currently traveling.

3. The vehicle control device according to claim 1, wherein the driving controller switches from the first driving mode to the second driving mode before the vehicle enters the second section when the second section is present within a predetermined distance from the vehicle in a state in which the traveling lane of the vehicle when traveling in the first section is not identified by the identifier while the first driving mode is executed.

4. The vehicle control device according to claim 1, wherein the driving controller switches from the first driving mode to the second driving mode when the first section and the second section are present within a predetermined distance in the traveling direction of the vehicle while the first driving mode is executed, and the vehicle travels in a lane other than a rightmost or leftmost lane of the road.

5. The vehicle control device according to claim 1, wherein the first map information is lane information for each road.

6. The vehicle control device according claim 1, wherein the identifier identifies the traveling lane of the vehicle on the basis of type information of road lane markings around the vehicle recognized by the recognizer or information on a target for which a lane position is identifiable.

7. The vehicle control device according to claim 1, wherein the identifier identifies the traveling lane of the vehicle on the basis of a direction in which a lane change of the vehicle is performed and the number of the lane changes.

8. The vehicle control device according to claim 1, further comprising:
an imager configured to capture an image of the surroundings of the vehicle,
wherein the identifier recognizes a type of lane markings of adjacent lanes adjacent to the traveling lane of the vehicle on the basis of an image captured by the imager and identifies the traveling lane of the vehicle on the basis of the recognized type of lane markings when the traveling lane of the vehicle is not identifiable.

9. The vehicle control device according to claim 1, wherein the acquirer acquires the first map information and second map information storing at least road information for each lane; and
the driving controller continues the first driving mode on the basis of the first map information when the second map information is not acquirable.

10. The vehicle control device according to claim 1, further comprising:
an output controller configured to cause an output device to output information prompting an occupant of the vehicle to execute a task according to the second driving mode when a driving mode of the vehicle is switched from the first driving mode to the second driving mode by the driving controller.

11. The vehicle control device according to claim 1, wherein the driving controller continues the first driving mode instead of switching from the first driving mode to the second driving mode when a branch destination road of the second section on which the vehicle is traveling is identifiable even if the second section is present within the predetermined distance from the vehicle in a state in which the traveling lane of the vehicle when traveling in the first section is not identified while the first driving mode is being executed.

12. A vehicle control method comprising:

by a computer, recognizing a surrounding situation of a vehicle;

controlling one or both of steering and a speed of the vehicle on the basis of the recognized surrounding situation;

acquiring first map information including lane information around a vehicle and reference information for identifying a position of the vehicle;

identifying a traveling lane of the vehicle among one or more lanes included in a road on which the vehicle travels from the first map information on the basis of the acquired reference information;

causing the vehicle to travel by executing any one of a plurality of driving modes including at least a first driving mode in which a task of gripping an operator that receives a steering operation of the vehicle is not imposed on an occupant of the vehicle and a second driving mode in which a task imposed on the occupant is heavier than in the first driving mode and a task of gripping the operator is imposed on the occupant;

executing the first driving mode when a traveling lane of the vehicle is identified;

switching from the first driving mode to the second driving mode when a first section in which a traveling lane of the vehicle is undefinable and a second section having a fork having at least three branching lanes within a predetermined distance in the traveling direction of the vehicle, and changing lanes in the second driving mode to a lane in the first section in which the traveling lane of the vehicle is identifiable when the traveling lane of the vehicle is not identifiable and does so whether or not there is a lane increase in the first section.

* * * * *